United States Patent [19]
Sperling et al.

[11] 4,254,002
[45] Mar. 3, 1981

[54] TOUGH PLASTICS BASED ON CASTOR OIL ELASTOMER-REINFORCED VINYL POLYMERS

[76] Inventors: L. H. Sperling, 1134 W. Market St., Bethlehem, Pa. 18015; J. A. Manson, 1320 Sycamore St., Bethlehem, Pa. 18017; N. Devia-Manjarres, Calle 8 Sur 15-39, Bogota, Colombia

[21] Appl. No.: 13,030

[22] Filed: Feb. 21, 1979

[51] Int. Cl.$^3$ .............................................. C08L 91/00
[52] U.S. Cl. ...................... 260/23 ST; 260/23 TN; 260/23 CP; 260/23 XA; 260/23 S
[58] Field of Search ........... 260/23 S, 23 TN, 23 XA, 260/23 CP, 23 ST

[56] References Cited

U.S. PATENT DOCUMENTS

| | | | |
|---|---|---|---|
| 3,100,195 | 8/1963 | Zomlefer | 260/23 S |
| 3,222,341 | 12/1965 | Barrett et al. | 260/23 S |
| 3,234,157 | 2/1966 | Schefbauer | 260/23 S |
| 3,265,766 | 8/1966 | Harris | 260/23 S |
| 3,359,219 | 12/1967 | Ingram et al. | 260/23 S |
| 3,523,095 | 8/1970 | Lauvito et al. | 260/23 S |
| 3,719,623 | 3/1973 | Blank | 260/23 S |

*Primary Examiner*—William F. Hamrock
*Attorney, Agent, or Firm*—Paul F. Prestia

[57] ABSTRACT

The process, and product thereof, in which castable compositions comprising mixtures of 5-15% (by weight) of (1) a monomer or prepolymer mixture of castor oil and a dicarboxylic acid or urethane and (2) a vinyl copolymer mixture such as styrene and divinyl benzene with suitable cross-linking agents are made into highly useful products composed of simultaneously formed interpenetrating polymer networks. This process consists of first raising the temperature of the mixture to initiate polymerization of the vinyl copolymer, then, following phase separation and phase inversion but before gelation occurs, forming a product from the composition and thereafter heating the formed product to effect completion of the polymerization and cross-linking reactions.

14 Claims, No Drawings

TOUGH PLASTICS BASED ON CASTOR OIL ELASTOMER-REINFORCED VINYL POLYMERS

BACKGROUND OF THE INVENTION

The invention described herein relates broadly to tough, impact-resistant plastics containing elastomeric polyesters and/or polyurethanes of castor oil. The present invention relates specifically to a process adapted to produce a castor oil-based reinforced product much superior to any heretofore available.

From earlier publications emanating from the laboratory of the inventors herein, it is known that castor oil polyesters or polyurethanes may be used in place of conventional rubbers, such as polybutadiene, as the reinforcement component in impact-resistant or reinforced vinyl plastics, such as polystyrene. These publications are typified by:

G. M. Yenwo, J. A. Manson, J. Pulido, L. H. Sperling, A. Conde, and N. Devia, J. Appl. Polym. Sci., 21, 1531 (1977).

N. Devia-Manjarres, J. A. Manson, L. H. Sperling, and A. Conde, Polym. Eng. Sci., 18, 200 (1978).

These publications suggest both castor oil polyesters or polyurethanes as the reinforcement rubber component in impact-resistant polyvinyl such as polystyrene (when the castor oil elastomer comprises less than about 15% of the mixture) and polyvinyl reinforced castor oil polyurethane or polyester elastomers when the castor oil elastomer comprises more than about 15%.

Inasmuch as a product of the present invention involves simultaneously formed interpenetrating polymer networks, it may be relevant to consider that such polymeric mixtures are in some respects related to graft copolymers. In the graft copolymer art, a number of patents describe systems wherein some form of, at least partially, interpenetrating network of polymers result. Such descriptions are found, for example, in the following patents:

| U.S. Patents | Foreign Patents |
| --- | --- |
| 3,041,292 | Br. 1,197,794 |
| 3,055,859 | Br. 1,239,701 |
| 3,316,324 | |
| 3,426,102 | Gr. 2,153,987 |
| 3,657,379 | Gr. 2,518,904 |
| 3,833,404 | |
| 3,948,823 | |

It will be noted that none of these patents disclose any relationship of the systems there involved to castor oil based reinforced polyvinyl plastics.

Of further interest, by way of a description of background technology with respect to the present invention, it is reasonably well-known that in the forming of elastomeric reinforced polyvinyl plastic products, it is highly desirable to produce an optimum product by initiating the polymerization of the vinyl component in the mixture to the point of phase separation and then phase inversion (produced upon continued polymerization of the vinyl component and continued stirring, followed by casting or forming of the product and then completion of polymerization of both the vinyl phase and the reinforcement). Such processing conditions are described in the following publications:

G. E. Molau and H. Keskkula, J. Polym. Sci., A-1, 4, 1595 (1966).

C. B. Bucknall, "Toughened Plastics", Applied Science Publishers, Ltd., London, 1977.

That such phase inversion is important to the characteristics of these final products has been known for some time, as shown, for example, by the publications and photomicrographs of Matsuo. (M. Matsuo, Japan Plastics, 2, 6 (July, 1968). (M. Matsuo, Polym. Eng. Sci., 9, 206 (1969).

Notwithstanding the foregoing, there remained a need, prior to the present invention, for tougher and more wear-resistant castor oil elastomer-reinforced polyvinyl compositions. The object of the present invention is to produce such compositions and to provide the process conditions by which such compositions are produced.

With the present invention, this objective is achieved, in part due to the simultaneously formed interpenetrating polymer network of the product. At the same time, the present invention is considered particularly advantageous in its use of castor oil and related products in place of diene and vinyl petroleum-based elastomers as reinforcements in polyvinyl plastics. Castor oil, of course, is a "renewable resource" in that both castor oil and sebacic acid (reactable together to form a castor oil polyester as used in the present invention) are derived from castor beans which are grown in great quantities in many parts of the world, such as India and Brazil. In addition, in the compositions of the present invention, properties comparable or superior to those of petroleum-based reinforced products are obtainable.

SUMMARY OF THE INVENTION

Reinforced plastics produced in accordance with the present invention find use as impact-resistant plastics in such diverse forms as automobile panels, appliance cabinets and toys.

These products are produced by a type of synthesis yielding a polymeric molecular structure known as simultaneous interpenetrating networks (SIN's). This involves the mixing of all components at an early stage, followed by the formation of both of the interpenetrating networks (IPN's) via independent reactions proceeding in the same container. One network can be formed by a chain growth mechanism and the other by a step growth mechanism. Morphology and physical properties of these systems have been found to be especially dependent on the mode of mixing, polymerization conditions, and relative rates of polymerization and gel information.

Mixtures of castor oil elastomeric products (comprising up to 15% by weight of the mixture) and polymerizable vinyl compounds having a glass transition temperature above 50° C., together with suitable crosslinking agents, are heated to a temperature (generally in the range 60°–90° C.) to initiate vinyl polymerization but not sufficient to initiate castor oil elastomer polymerization or crosslinking. This mixture is continuously stirred until the vinyl polymer first separates as a separate phase and then undergoes phase inversion such that it becomes a continuous phase in the emulsified mixture (a period generally on the order of 110–140 hours). At this stage, the mixture is cast or formed into final product shape, at which time or thereafter polymerization is permitted to proceed at elevated temperatures with completion of castor oil elastomer polymerization effected by elevating the temperature of the product to well above the glass transition temperature of the castor oil elastomer (generally requiring about 12 hours at 180°

C.). The product of this process is a tough wear-resistant castor oil elastomer-reinforced vinyl plastic comprising to a significant degree simultaneously-formed interpenetrating networks of the two polymeric constituents.

Preferably, the castor oil elastomer is a castor oil polyester produced from castor oil and sebacic acid (itself derived like castor oil from the castor bean) and the preferred polymerizable vinyl is styrene.

DETAILED DESCRIPTION OF THE INVENTION, INCLUDING PREFERRED EMBODIMENTS

Among all the vegetable oils, castor oil has very special characteristics that have made it one of the most important commercial oils. Extracted from the beans of the plant Ricinus communis that grows throughout much of the tropical world, it is one of the few naturally occurring triglycerides that approaches being a pure compound and is the only major oil composed essentially (about 90% by weight) of the triglycerides of a hydroxy acid, ricinoleic acid.

The ricinoleic acid triglyceride has the structural formula as follows:

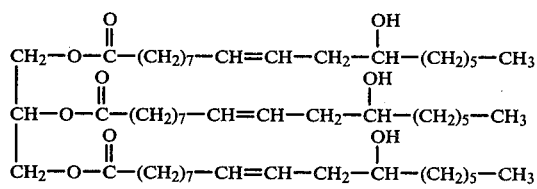

While many dicarboxylic acids will react with castor oil to yield an elastomeric product, sebacic acid and its derivatives are preferred because (1) sebacic acid yields an elastomer with a low ($< -40°$ C.) glass transition temperature and (2) sebacic acid is commercially derived from castor oil. Thus, such an elastomer is based 100% on castor oil. For these reasons, the preferred elastomers employed in the present invention include the crosslinked polyester of castor oil and sebacic acid and sebacic acid derivatives, the crosslinked polyurethane with 2,4 tolylene diisocyanate, and the crosslinked poly(ester-urethane) from castor oil, sebacic acid, and 2,4 tolylene diisocyanate.

The vinyl polymers employed should have glass transition temperatures about 50° C., i.e., they should be of the type commonly known as plastics. The polymerizable vinyl monomers include, but are not limited to, methyl methacrylate and homologues, styrene and derivatives, and vinyl chloride and homologues.

Crosslinking monomers such as divinyl benzene are also included; levels of about 1% based on plastic monomer composition are preferred, but many types of di- and multivinyl compounds such as ethylene dimethacrylate or trimethlolpropane trimethacrylate may also be employed.

Because of low cost and good properties, polystyrene is the plastic of choice. An especially preferred embodiment is polystyrene crosslinked with 1% divinylbenzene (55% soln), using 0.4% benzoyl peroxide as the initiator.

While castor oil elastomer-reinforced plastics with up to 15% by weight elastomer, may be made in accordance with the present invention (and indeed the necessary phase separation and inversion cannot be produced in a castor oil-sebacic acid polyester and polystyrene system when the elastomer exceeds 15%), the compositions described specifically below are based primarily on a 10% castor oil elastomer content. The morphology of the SIN's thus produced are sensitive to synthetic details, such as the reaction time with stirring, and the time after pouring into a mold, after which the reaction was continued without stirring. A definite "window" was shown to exist, especially for the tough plastic compositions, controlled by the time required for phase inversion on one side and the time to reach gelation on the other. Gelation (caused by crosslinking of the simultaneously formed IPN's) of course, is peculiar to compositions of the present invention as contrasted with the non-crosslinked prior art rubber elastomeric reinforced plastics, including polystyrene in which phase separation and inversion has previously been observed.

Morphology studies throughout the course of the polymerizatioln revealed that with proper stirring a phase inversion occurs for polystyrene compositions with up to about 15% castor oil elastomer content. The polystyrene phase cannot be made the continuous phase by mechanical stirring above about 15% castor oil elastomer content. These latter materials form elastomers.

EXAMPLES OF THE PRESENT INVENTION

General Synthetic Procedure

Three groups of materials were obtained by changing the nature of the castor oil-based elastomer. These are described separately below (i.e. not in combination with the reinforced polymer), as is the polymerization procedure for a straight polystyrene. For the elastomer, step growth polymerizations using the hydroxyl groups in the oil yield a polyester, a polyurethane, and a mixed polyester-urethane elastomer. Since reactivities of the different functional groups involved in the reaction make the synthesis procedure different, each of these synthesis will be described briefly under a separate heading.

HOMOPOLYMER NETWORKS

Castor Oil Polyester Networks (COPEN)

Polyester networks (COPEN) were obtained by reacting prepolymer materials, namely castor oil with sebacic acid, poly(sebacic anhydride) (PSA), or sebacyl chloride under appropriate conditions to give reasonable gel times. Polyester elastomers having COOH/OH ratios of 1.0, 0.9 and 0.8 were obtained by varying the reaction proportions. While several tin-based catalysts were tested, SOCT (T-9, M & T Chemicals) provided superior in shortening reaction times. A catalyst concentration of 0.1% wt of stannous ion based on total charge was used in the castor oil-sebacic acid and castor oil-PSA reactions. These reactions were carried out at temperatures ranging from 180°–200° C. in the 500 ml. reactor described above. Close to the gel point, the reactant mixture was cooled down to 170° C., degassified by applying a vacuum and poured into teflon lined molds. Table 1 gives the composition and properties of the polyester prepolymers at this point. The reaction was completed at 180° C. in an oven filled with $N_2$ over a 24 hour period. A vacuum was applied during the next 24 hours to force the reaction toward the polyester formation by increasing the rate of water removal. Polyester networks were also obtained by reacting castor oil and sebacyl chloride at temperatures between 0°–40° C. A typical synthesis involved the mixing of the comonomers, stirring for 1–5 minutes, degassing by vacuum, and pouring into molds. After gelation, the sample was removed from the molds and cured by applying either vacuum or dry nitrogen. The reaction was usually complete within 2-3 hours.

Castor Oil Polyurethane Networks (COPUN)

Synthesis of urethane elastomers was carried out by reacting equivalent amounts of castor oil and 2,4 tolylene diisocyanate (TDI) to give a NCO/OH ratio of unity. Bubble-free elastomers were obtained either by using a prepolymerization step or by adding 20% volume of dried toluene to the reaction mixture.

required for network formation (COOH/OH = 0.64) was charged and reacted almost completely.

Crosslinking of this prepolymer, designated COPEP4, was carried out by first adding 20% of dried toluene, followed by addition of 2,4 TDI under stirring at room temperature. The toluene allowed a convenient means of easier handling and provided elastomers polymerized under conditions similar to those employed in SIN formation. Curing was done at 80° C. for 24 hours, 100° C. for 22 hours to remove the toluene, and 2 hours at 130° C. Table 1 gives weight proportions used in the synthesis of 100 gr. of each elastomer.

TABLE 1

COMPOSITION, CHARACTERISITCS, AND CURING CONDITIONS OF CASTOR OIL PREPOLYMERS
(Base: 100 gr. of final elastomer)

Type: Polyester

| | Prepolymer | | | | | Curing | |
|---|---|---|---|---|---|---|---|
| Designation | Castor Oil | Sebacic Acid | COOH/OH | Conversion P | Acid Value | Conversion at Gel. Pc | Conditions |
| COPEP1 | 80.48 | 23.73 | 1.0 | 0.740 | 33.0 | 0.760 | T 180-200° C. |
| COPEP2 | 82.09 | 21.79 | 0.9 | 0.785 | 25.2 | 0.807 | P 3.0 KPa |
| COPEP3 | 83.76 | 19.76 | 0.8 | 0.840 | 17.1 | 0.857 | t 48 hrs |

Type: Polyester Urethane

| | Prepolymer | | | | | Curing | | |
|---|---|---|---|---|---|---|---|---|
| Designation | Castor Oil | Sebacic Acid | COOH/OH | Conversion | Acid Value | Curing Agent | Wt | Conditions |
| COPEP4 | 80.07 | 14.17 | 0.6 | 0.988 | 1.5 | TDI | 8.28 | T 80-130° C. P 100 KPa t 3-24 hrs |

Type: Polyurethane

| | Prepolymer | | | | Curing | | |
|---|---|---|---|---|---|---|---|
| Designation | Castor Oil | TDI | NCO/OH | Equivalent Weight/NCO | Curing Agent | Weight Added | Conditions |
| COPUP1 | 36.26 | 20.23 | 2.2 | 445.3 | castor oil | 43.5 | T 80-130° C. P 100 KPa t 3-24 hrs |

In brief, an isocyanate-terminated prepolymer was first prepared by adding 1 equivalent of castor oil to 2.2 equivalents of 2,4 TDI, with stirring, at a temperature which was always kept below 70° C. After continued stirring for 2 hours, the prepolymer was degassed until a clear viscous liquid was formed, COPUP1. Fully reacted samples were then prepared by adding castor oil, mixing for 10 minutes with a high torque stirrer, degassed and poured into the molds. Samples were cured at 80° C. for 24 hours followed by 2 hours at 130° C. Table 2 shows the composition and characteristics of the prepolymer as well as the curing conditions.

Castor Oil Poly(ester-urethane) Networks (COPEUN)

The third type of castor oil elastomer was synthesized by a combination of the two methods described above. A polyester prepolymer was prepared under conditions similar to those described above. However, less sebacic acid (COOH/OH = 0.6) than the minimum amount

Polystyrene Network (PSN)

Polystyrene homopolymer forms a brittle plastic.

TABLE 2

TENSILE PROPERTIES OF SIN'S CONTAINING 10% CASTOR OIL ELASTOMER AT AMBIENT CONDITIONS

| | | Tensile Stress[1] | | | | |
|---|---|---|---|---|---|---|
| Composition | Izod Impact Strength J/m | At Yield MPa | At Break MPa | % Strain At Break | Elastic Modulus MPa | Fracture Energy[2] J/m |
| PSN | 13.3 | — | 46.1 | 2.2 | 2360 | 0.58 |
| COPEN/PSN | 67.8 | 31.1 | 37.02 | 16.0 | 1520 | 5.37 |
| COPEUN/PSN | 44.4 | 22.1 | 25.5 | 18.5 | 1090 | 3.46 |
| COPUN/PSN | 24.6 | 37.3 | 36.7 | 6.4 | 1680 | 2.01 |

[1]Samples tested at 2.11 × 10$^{-5}$ m/s (ASTM D 1708).
[2]Calculated based on the area under the stress-strain curves.

Freshly distilled styrene monomer was mixed with 1% divinyl peroxide, and the mixture sparged with nitrogen gas. The resulting solution was syringed into a glass plate mold and sealed. On heating to 80° C., the polystyrene polymerizes in 1-3 days.

SIN Synthesis

Synthesis of SIN's were carried out by charging the proper amount of the selected castor oil prepolymer or partially polymerized forms thereof (from those described separately above) into a 500 ml. reactor, followed by the addition of a styrene mixture (as described separately above). After stirring and purging with nitrogen for 5-10 minutes, the curing agent for the elastomer prepolymer was added. All SIN formations gave slightly yellowish but clear solutions. In each case, the temperature was raised to 80° C. and polymerization carried out under continued stirring with a nitrogen atmosphere. Pouring into preheated molds was done after about 80 to 120 minutes for the compositions, each having 10% or less elastomer content. All samples were then further polymerized at 80° C. for 24 hours and at 180° C. for 12 hours. Final sample dimensions were 18 × 18 cm and up to 0.8 cm thick.

Each individual composition, of course, yields optimum toughness when synthesized in a particular manner. As an example, the reaction progress of a COPEN/PSN containing 10% castor oil will be described below.

Castor oil and sebacic acid were reacted at 180°–200° C. until the mixture approached gelation, so a branched prepolymer having an equal number of both functional groups (COPEP1) was obtained. Due to the high temperatures required for polyester formation, the reaction was readily stopped by cooling the prepolymer to 80° C. The styrene comonomer mixture was then prepared at room temperature and charged to the reactor containing the polyester prepolymer and mixed therein. This yielded a mutual solution of all components required for the formation of both networks. The temperature was then raised to 80° C. in order to initiate the styrene polymerization. (The polyester rection rate is nil at this temperature.) In polymerizing the styrene component within the polyester prepolymer mixture, the first amounts of polystyrene produced early in the reaction remained dissolved until some critical concentration was reached, followed by phase separation.

The solution was then transformed to an oil-in-oil emulsion in which the polystyrene solution formed the disperse phase and the elastomer polyester component solution the continuous phase. The point of phase separation is observed experimentally by the onset of turbidity, due to the Tyndall effect. The conversion required for phase separation to occur depends basically on the solubility of the polystyrene chains in the elastomer solution, which in turn is governed by the elastomer concentration and compatibility of the two polymers.

As polymerization proceeded, the total volume of polystyrene predominant phase increased rapidly at the expense of the styrene monomer from the solution. With stirring, a phase inversion occurred. At this point, stirring was discontinued and the polymerizing material poured into the final molds. It is important that this was done after phase inversion but before gelation of either component. The optimum time for stirring before pouring was between 110 and 140 minutes.

SPECIFIC EXAMPLE 1

In a resin kettle reactor equipped with a nitrogen inlet, high torque stirrer, thermometer, a distilling Barret trap and a Friedrichs condenser, polyester prepolymer was prepared by reacting 80.48 parts (by weight unless otherwise indicated) of DB grade castor oil, 23.74 parts of reagent grade sebacic acid and 0.38 parts of T-9 M & T catalyst at 200° C. for 220 minutes. A nitrogen flow of 40 cc/min was continuously kept during the reaction.

To 99 parts of freshly distilled styrene monomer, 1.0 part of divinyl benzene (DVB) technical solution (55% soln of isomers) and 0.4 parts of benzoyl peroxide (BP) were added.

Then 12.81 parts of the polyester prepolymer were dissolved in 115.5 parts of the styrene-DVB-BP solution at 25° C. (about 10% polyester prepolymer). The clear solution formed was then polymerized at 80° C. with stirring for 120 minutes, under a $N_2$ atmosphere, followed by placing into teflon lined glass molds; polymerization was continued for 56 hours at 80° C. followed by a postcuring period of 24 hours at 180° C. under vacuum. The mechanical data obtained on the resulting plastic is shown in Table 2. The values are comparable to high impact polystyrene toughened with polybutadiene.

We claim:

1. A method for producing a formed castor oil elastomeric-reinforced polyvinyl plastic product which comprises heating a mixture consisting of (a) 5–15% by weight of a castor oil elastomer prepolymer and catalyst therefor said prepolymer selected from the group consisting of a caster oil-multibasic acid polyester and a multifunctional isocyanate and copolymers thereof, and (b) 95–85% of a vinyl, plastic forming monomer selected from the group consisting of methyl methacrylate and homologues, styrene and derivatives and vinyl chloride and homologues, together with a multivinyl crosslinking monomer therefor to a temperature sufficiently high to initiate polymerization of said vinyl but not sufficiently high to polymerize said castor oil elastomer prepolymer, stirring said mixture at said temperature until said vinyl is polymerized sufficiently to form a separate phase and to become a continuous separate phase, but before said composition begins to gel due to crosslinking of said vinyl, then forming the reacting mixture to final product shape and holding said formed product at said elevated temperature for at least an hour, after which it is heated to a second elevated temperature sufficiently high to completely polymerize said castor oil elastomer prepolymer and holding said product at said temperature until said reaction is complete.

2. The method of claim 1, wherein said multibasic acid is sebacic acid.

3. The method of claim 1, wherein said elastomer prepolymer includes a catalyst.

4. The method of claim 3, wherein the catalyst is a tin based catalyst.

5. The method of claim 1, wherein the plastic forming monomer is styrene.

6. The method of claim 5, wherein the vinyl crosslinking monomer is divinyl benzene.

7. The method of claim 6, wherein said composition includes a free radical initiator.

8. The method of claim 7, wherein said initiator is benzoyl peroxide.

9. The method of claim 1, wherein said multifunctional isocyanate is 2,4 tolylene diisocyanate.

10. The method of any of claims 1, 2, 4, 5, 6, 8, wherein said castor oil elastomer prepolymer in said mixture is partially prepolymerized before combination with said vinyl monomer.

11. The method of any of claims 1, 2, 4, 5, 6, 8, wherein said mixture is stirred at a first elevated temperature of 60°–90° C. for 110–140 hours prior to product forming, is thereafter held at said temperature for hours and is then finally cured at 180° C. for 12 hours.

12. A product produced by any of the methods recited in claim 1–9.

13. A product produced by the method of claim 10.

14. A product produced by the method of claim 11.

* * * * *